US012777441B2

(12) United States Patent
Lin

(10) Patent No.: US 12,777,441 B2
(45) Date of Patent: Oct. 27, 2026

(54) WIRELESS COMMUNICATION METHOD AND USER EQUIPMENT

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 287 days.

(21) Appl. No.: 18/545,593

(22) Filed: Dec. 19, 2023

(65) Prior Publication Data

US 2024/0121739 A1 Apr. 11, 2024

Related U.S. Application Data

(63) Continuation of application No. PCT/IB2021/000564, filed on Aug. 6, 2021.

(51) Int. Cl.

*H04W 56/00* (2009.01)
*H04W 76/20* (2018.01)
*H04W 84/06* (2009.01)

(52) U.S. Cl.

CPC ... *H04W 56/0045* (2013.01); *H04W 56/0065* (2013.01); *H04W 76/20* (2018.02); *H04W 84/06* (2013.01)

(58) Field of Classification Search

CPC ........... H04W 74/006; H04W 56/0025; H04W 56/0045; H04W 56/0065; H04W 76/20; H04W 84/06; H04B 7/18532; H04B 7/18513; H04B 7/18519; H04B 7/1851; H04L 5/0085; H04L 1/1854; H04L 5/0094; H04L 5/0053

See application file for complete search history.

(56) References Cited

U.S. PATENT DOCUMENTS

| | | | | |
|---|---|---|---|---|
| 9,189,451 | B1 * | 11/2015 | Freedman | H04N 23/80 |
| 2017/0005741 | A1 * | 1/2017 | Wu | H04W 24/08 |
| 2022/0095258 | A1 * | 3/2022 | Yeo | H04W 56/0045 |
| 2022/0386263 | A1 * | 12/2022 | Miao | H04L 5/0091 |
| 2022/0393957 | A1 * | 12/2022 | Wang | H04B 7/18513 |

(Continued)

FOREIGN PATENT DOCUMENTS

| | | | |
|---|---|---|---|
| CN | 115190081 A * | 10/2022 | H04L 47/56 |
| CN | 115190081 B * | 4/2025 | H04L 47/56 |

(Continued)

OTHER PUBLICATIONS

European Examination Report for the corresponding European Patent Application No. 21783039.7, mailed Oct. 8, 2024 (8 pages).

(Continued)

*Primary Examiner* — Atique Ahmed

(74) *Attorney, Agent, or Firm* — Ladas & Parry, LLP

(57) ABSTRACT

A wireless communication method and a user equipment (UE) are provided. The wireless communication method is performed by a UE and includes: determining, by the UE, a first information and/or a second information and applying, by the UE, the first information and/or the second information for a downlink reception and/or an uplink transmission.

16 Claims, 4 Drawing Sheets

(56) References Cited

U.S. PATENT DOCUMENTS

| | | | | |
|---|---|---|---|---|
| 2023/0038582 | A1* | 2/2023 | Lin | H04W 72/0446 |
| 2023/0099762 | A1* | 3/2023 | Khoshkholgh Dashtaki | H04W 56/001 370/350 |
| 2023/0105278 | A1* | 4/2023 | Kim | H04W 56/005 370/503 |
| 2023/0113784 | A1* | 4/2023 | Cha | H04W 72/1268 370/329 |
| 2023/0189088 | A1* | 6/2023 | Shin | H04B 7/1851 455/427 |
| 2023/0254795 | A1* | 8/2023 | Ryu | H04B 7/1855 370/350 |
| 2023/0403667 | A1* | 12/2023 | Hosseinian | H04W 56/005 |
| 2024/0121060 | A1* | 4/2024 | Prasad | H04L 5/0051 |

FOREIGN PATENT DOCUMENTS

| | | | |
|---|---|---|---|
| EP | 3873003 | A1 | 9/2021 |
| EP | 3913996 | A1 | 11/2021 |
| WO | 2019217026 | A1 | 11/2019 |
| WO | 2021062666 | A1 | 4/2021 |
| WO | 2021159726 | A1 | 8/2021 |
| WO | 2022027230 | A1 | 2/2022 |
| WO | 2022030851 | A1 | 2/2022 |
| WO | 2022052917 | A1 | 3/2022 |
| WO | 2023012491 | A1 | 2/2023 |

OTHER PUBLICATIONS

Ericsson, “On NTN synchronization, random access, and timing advance,” R1-1910982, 3GPP TSG-RAN WG1 Meeting #98bis, R1-1910982, Chongqing, China, Oct. 14-20, 2019.
VIVO:“Discussion on UL time and frequency synchronization enhancement for NR-NTN”, 3GPP TSG RAN WG1 #104-e, R1-2100442, e-Meeting, Jan. 25-Feb. 5, 2021.
ITRI :“Discussion on NTN TA pre-compensation”, 3GPP TSG-RAN WG2 Meeting #113 electronic, R2-2100828, Online, Jan. 25-Feb. 5, 2021.
Sony :“Calculation of timing relationship offsets,” 3GPP TSG RAN WG1 #103-e R1-2008359, e-Meeting, Oct. 26-Nov. 13, 2020.
Apple:“Uplink Time and Frequency Synchronization for NTN”, 3GPP TSG RAN WG1 #105-e, R1-2105102 e-Meeting, May 10-27, 2021.
CATT:“PRACH design and oLtiming advance” , 3GPP TSG RAN WG1 Meeting #97 R1-1906325, Reno, USA, May 13-17, 2019.
International Search Report, International Application No. PCT/IB2021/000564, mailed May 3, 2022.
Written Opinion of International Searching Authority for International Application No. PCT/IB2021/000564, May 3, 2022.
Office Action of the European application No. 21783039.7, issued on Mar. 17, 2025.
Third Office Action of the corresponding European patent application No. 21783039.7, issued on Oct. 16, 2025.
Fourth Office Action of the corresponding European patent application No. 21783039.7, issued on May 7, 2026.

* cited by examiner

WIRELESS COMMUNICATION METHOD AND USER EQUIPMENT

CROSS REFERENCE TO RELATED APPLICATIONS

The present disclosure is a continuation of International Patent Application No. PCT/IB2021/000564, filed Aug. 6, 2021, the disclosure of which is herein incorporated by reference in its entirety.

TECHNICAL FIELD

The present disclosure relates to the field of communication systems, and more particularly, to a wireless communication method and a user equipment.

BACKGROUND

Non-terrestrial networks (NTNs) refer to networks, or segments of networks, using a spaceborne vehicle or an airborne vehicle for transmission. Spaceborne vehicles include satellites including low earth orbiting (LEO) satellites, medium earth orbiting (MEO) satellites, geostationary earth orbiting (GEO) satellites, and highly elliptical orbiting (HEO) satellites. Airborne vehicles include high altitude platforms (HAPs) encompassing unmanned aircraft systems (UAS) including lighter than air (LTA) unmanned aerial systems (UAS) and heavier than air (HTA) UAS, all operating in altitudes typically between 8 and 50 km, quasi-stationary.

Communication via a satellite is an interesting means thanks to its well-known coverage, which can bring the coverage to locations that normally cellular operators are not willing to deploy either due to non-stable crowd potential client, e.g., extremely rural, or due to high deployment cost, e.g., middle of ocean or mountain peak. Nowadays, the satellite communication is a separate technology to a 3rd generation partnership project (3GPP) cellular technology. Coming to 5G era, these two technologies can merge together, i.e., we can imagine having a 5G terminal that can access to a cellular network and a satellite network. The NTN can be good candidate technology for this purpose. It is to be designed based on 3GPP new radio (NR) with necessary enhancement.

In terrestrial network, e.g., Release (Rel.) 15, a timing advance (TA) for an uplink transmission is controlled by a network via timing advance command (TAC), i.e., TS 38.213. A user equipment (UE) does not update the TA until it receives a new TAC. In NTN system, when a satellite is moving with a high velocity with regards to the UE position on earth, relying solely on the network to control a synchronization adjustment does not seem to be feasible, since the adjustment needs to be performed very often, leading to an unaffordable signaling overhead. Further, in NTN, due to very high satellite altitude, a round trip time (RTT) between a sender (satellite/UE) and a receiver (UE/satellite) is extremely long. In Rel. 15 NR, the RTT is usually compensated by the timing advance. However, in NTN, the long RTT will result in a very long TA. How to indicate this long TA is still an open issue.

Therefore, there is a need for an apparatus (such as a user equipment (UE) and/or a base station) and a method of wireless communication, which can solve issues in the prior art, provide a method for UE operation in non-terrestrial network (NTN) systems, reduce signaling overhead, provide a good communication performance, and/or provide high reliability.

SUMMARY

In a first aspect of the present disclosure, a method of wireless communication by a user equipment (UE) comprises determining, by the UE, a first information and/or a second information and applying, by the UE, the first information and/or the second information for a downlink reception and/or an uplink transmission.

In a second aspect of the present disclosure, a method of wireless communication by a base station comprises controlling a user equipment (UE) to determine a first information and/or a second information and apply the first information and/or the second information for a downlink reception and/or an uplink transmission.

In a third aspect of the present disclosure, a user equipment comprises a memory, a transceiver, and a processor coupled to the memory and the transceiver. The processor is configured to determine a first information and/or a second information and apply the first information and/or the second information for a downlink reception and/or an uplink transmission.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1A:
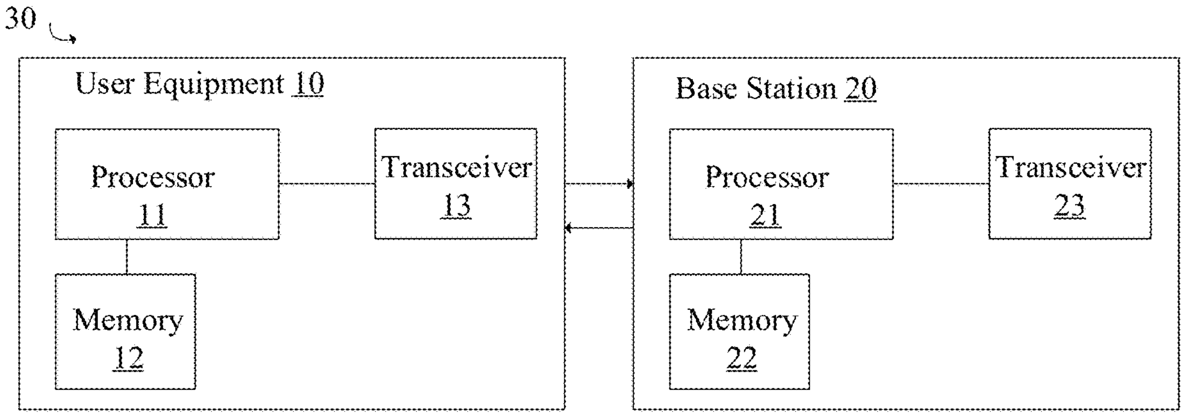
FIG. 1A is a block diagram of one or more user equipments (UEs) and a base station (e.g., gNB or eNB) of communication in a communication network system (e.g., non-terrestrial network (NTN) or a terrestrial network) according to an embodiment of the present disclosure.

FIG. 1A illustrates that, in some embodiments, one or more user equipments (UEs) 10 and a base station (e.g., gNB or eNB) 20 for transmission adjustment in a communication network system 30 (e.g., non-terrestrial network (NTN) or terrestrial network) according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the communication between the UE 10 and the BS 20 comprises non-terrestrial network (NTN) communication. In some embodiments, the base station 20 comprises spaceborne platform or airborne platform or high altitude platform station. The base station 20 can communicate with the UE 10 via a spaceborne platform or airborne platform, e.g., NTN satellite 40, as illustrated in FIG. 1B.

Figure 1B:
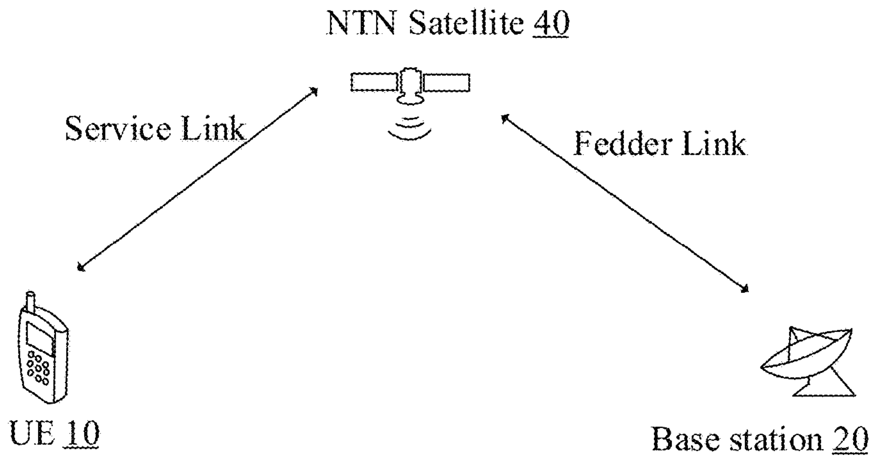
FIG. 1B is a block diagram of one or more user equipments (UEs) and a base station (e.g., gNB or eNB) of communication in a non-terrestrial network (NTN) system according to an embodiment of the present disclosure.

FIG. 1B illustrates a system which includes a base station 20 and one or more UEs 10. Optionally, the system may include more than one base station 20, and each of the base stations 20 may connect to one or more UEs 10. In this disclosure, there is no limit. As an example, the base station 20 as illustrated in FIG. 1B may be a moving base station, e.g. spaceborne vehicle (satellite) or airborne vehicle (drone). The UE 10 can transmit transmissions to the base station 20 and the UE 10 can also receive the transmission from the base station 20. Optionally, not shown in FIG. 1B, the moving base station can also serve as a relay which relays the received transmission from the UE 10 to a ground base station or vice versa. Optionally, a satellite 40 may be seen as a relay point which relays the communications between a UE 10 and a base station 20, e.g. gNB/eNB. Spaceborne platform includes satellite 40 and the satellite 40 includes LEO satellite, MEO satellite, and GEO satellite. While the satellite 40 is moving, the LEO satellite and MEO satellite are moving with regard to a given location on earth. However, for GEO satellite, the GEO satellite is relatively static with regard to a given location on earth. In some embodiments of this disclosure, some embodiments focus on the LEO satellite type or MEO satellite type, for which some embodiments of the disclosure aim at resolving an issue of wider range of frequency offset and/or Doppler offset (shift).

Spaceborne platform includes satellite, and the satellite includes low earth orbiting (LEO) satellite, medium earth orbiting (MEO) satellite and geostationary earth orbiting (GEO) satellite. While the satellite is moving, the LEO and MEO satellite is moving with regard to a given location on earth. However, for GEO satellite, the GEO satellite is relatively static with regard to a given location on earth.

In some embodiments, the processor 11 is configured to determine a first information and/or a second information and apply the first information and/or the second information for a downlink reception and/or an uplink transmission. This can solve issues in the prior art, provide a method for UE operation in non-terrestrial network (NTN) systems, reduce signaling overhead, provide a good communication performance, and/or provide high reliability.

In some embodiments, the processor 21 is configured to control the UE 10 to determine a first information and/or a second information and apply the first information and/or the second information for a downlink reception and/or an uplink transmission. This can solve issues in the prior art, provide a method for UE operation in non-terrestrial network (NTN) systems, reduce signaling overhead, provide a good communication performance, and/or provide high reliability.

Figure 2:
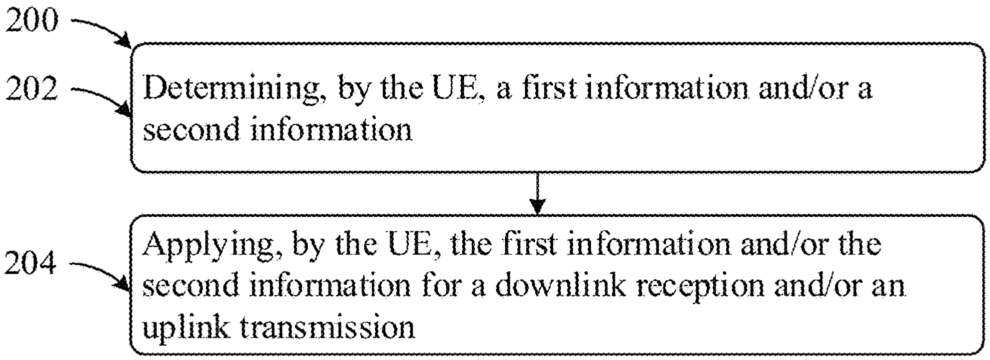
FIG. 2 is a flowchart illustrating a method of wireless communication performed by a user equipment (UE) according to an embodiment of the present disclosure.

FIG. 2 illustrates a method 200 of wireless communication by a user equipment (UE) 10 according to an embodiment of the present disclosure. In some embodiments, the method 200 includes: a block 202, determining, by the UE, a first information and/or a second information, and a block 204, applying, by the UE, the first information and/or the second information for a downlink reception and/or an uplink transmission. This can solve issues in the prior art, provide a method for UE operation in non-terrestrial network (NTN) systems, reduce signaling overhead, provide a good communication performance, and/or provide high reliability.

Figure 3:
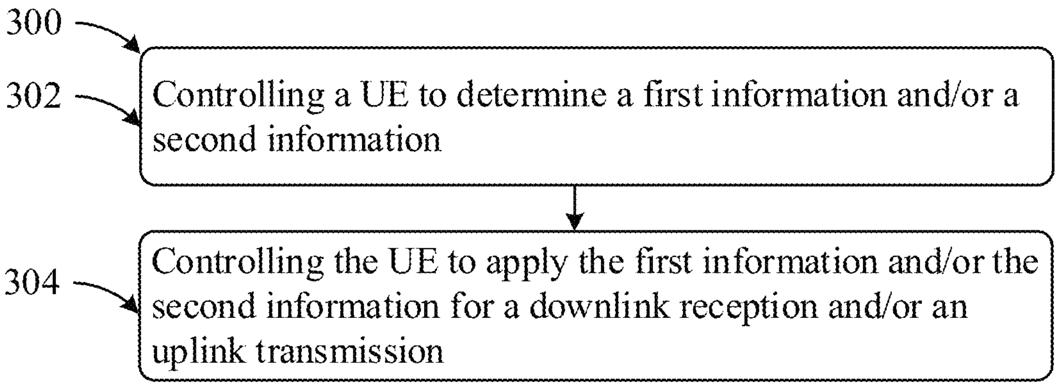
FIG. 3 is a flowchart illustrating a method of wireless communication performed by a base station according to an embodiment of the present disclosure.

FIG. 3 illustrates a method 300 of wireless communication by a base station 20 according to an embodiment of the present disclosure. In some embodiments, the method 300 includes: a block 302, controlling a UE to determine a first information and/or a second information, and a block 304, controlling the UE to apply the first information and/or the second information for a downlink reception and/or an uplink transmission. This can solve issues in the prior art, provide a method for UE operation in non-terrestrial network (NTN) systems, reduce signaling overhead, provide a good communication performance, and/or provide high reliability.

In some embodiments, the first information comprises a first timing advance, and/or the second information comprises a second timing advance. In some embodiments, the first timing advance is relevant to a service link (SL) propagation delay, and/or the second timing advance is relevant to a feeder link (FL) propagation delay. In some embodiments, the second timing advance is equal to twice of the FL propagation delay, and/or the second timing advance is a common TA to the UE. In some embodiments, the FL propagation delay comprises a delay between a non-terrestrial network (NTN) satellite, a space-borne vehicle, or an airborne vehicle and a reference point (RP). In some embodiments, the RP is on a base station or a gateway. In some embodiments, the FL propagation delay is obtained from at least one of the followings: a first position, a second position, a third position, a parameter, or an offset. In some embodiments, the first position is a position of a non-terrestrial network (NTN) satellite, a space-borne vehicle, or an airborne vehicle, and/or the second position is a position of a reference point (RP). In some embodiments, the position of the RP or the third position is static over time. In some embodiments, the FL propagation delay is calculated from a distance and/or a velocity relevant to the first position, the second position, the third position, the parameter, or the offset. In some embodiments, the distance is between the first position and the second position. In some embodiments, the velocity is a speed over a link between the first position and the second position. In some embodiments, the FL propagation delay at time T0 is calculated by the distance at time T0 divided by the velocity at time T0.

In some embodiments, the first position, the second position, and/or the third position comprises values at two dimensions or three dimensions. In some embodiments, the first position, the second position, and/or the third position comprises velocity at two dimensions or three dimensions. In some embodiments, the two dimensions comprise positions in axis X and axis Y, and/or the three dimensions comprise positions in axis X, axis Y and axis Z. In some embodiments, the first position, the second position, and/or the third position comprises one or more reference time corresponding to a position of the first position, the second position, and/or the third position and/or a velocity of the first position, the second position, and/or the third position. In some embodiments, the first position, the second position, the third position, the parameter, and/or the offset is provided by the base station to the UE. In some embodiments, the first position and/or the second position is provided in the system information and/or UE-specific radio resource control (RRC) configuration.

In some embodiments, the one or more reference time are corresponding to one or more slot boundaries or frame boundaries. In some embodiments, the FL propagation delay is obtained from the first position, the third position and the offset. In some embodiments, the FL propagation delay is obtained from a second delay and shifted by the offset in time. In some embodiments, a value of the offset is positive, negative, or zero. In some embodiments, the FL propagation delay is obtained from the first position and the third position. In some embodiments, the FL propagation delay is obtained from a second delay. In some embodiments, the second delay is calculated from a second distance and a second velocity. In some embodiments, the second distance is between the first position and the third position. In some embodiments, the second velocity is a speed over a link between the first position and the third position. In some embodiments, the FL propagation delay is obtained from the first position, the third position and the parameter. In some embodiments, the FL propagation delay at time T0 is obtained from the second delay at time T0+offset. In some embodiments, the offset is provided by the network to the UE in a system information and/or a UE-specific RRC configuration.

In some embodiments, the FL propagation delay is obtained from a second delay and shifted by a second offset in time. In some embodiments, the second offset is obtained from the second delay at one or more reference time (T_ref) and the parameter. In some embodiments, the parameter comprises one or more FL delay values corresponding to the one or more reference time T_ref. In some embodiments, a value of the second offset is positive, negative, or zero. In some embodiments, an absolute value of the difference between the FL propagation delay at the one or more reference time T_ref and the second delay at the one or more reference time T_ref shifted by the second offset is less than a first value. In some embodiments, the FL propagation delay at the one or more reference time T_ref is equal to the second delay at the one or more reference time T_ref shifted by the second offset.

In some embodiments, the first value is pre-defined or pre-configured. In some embodiments, a unit of the first value comprises millisecond, microsecond, or nanosecond. In some embodiments, the first value is equal to or less than 1 millisecond, 1 microsecond, or 1 nanosecond. In some embodiments, the parameter comprises a first FL delay corresponding to a first reference time. In some embodiments, the parameter is received by the UE in a first slot, the first reference time comprises a first slot boundary. In some embodiments, the parameter comprises a second FL delay corresponding to a second reference time. In some embodiments, the parameter is received by the UE in the first slot, and the second reference time comprises a second slot boundary. In some embodiments, the second slot is a number of slots after the first slot. In some embodiments, the number of slots is pre-defined or configured by the base station. In some embodiments, the number of slots is configured in a system information and/or a UE-specific RRC configuration.

In some embodiments, the parameter is received by the UE within a first frame, and the first reference time comprises the first frame boundary. In some embodiments, the parameter comprises a second FL delay corresponding to a second reference time. In some embodiments, the parameter is received by the UE within a first frame, and the second reference time comprises a second frame boundary. In some embodiments, the second frame is a number of frames after the first frames. In some embodiments, the number of frames is pre-defined or configured by the base station. In some embodiments, the number of frames is configured in a system information and/or a UE-specific RRC configuration. In some embodiments, the parameter is transmitted in a PDSCH transmission.

Figure 4:
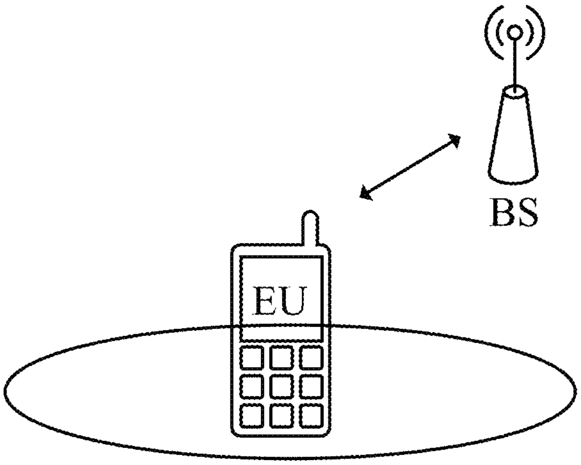
FIG. 4 is a schematic diagram illustrating a communication system including a base station (BS) and a UE according to an embodiment of the present disclosure.

FIG. 4 illustrates a communication system including a base station (BS) and a UE according to another embodiment of the present disclosure. Optionally, the communication system may include more than one base station, and each of the base stations may connect to one or more UEs. In this disclosure, there is no limit. As an example, the base station illustrated in FIG. 1A may be a moving base station, e.g., spaceborne vehicle (satellite) or airborne vehicle (drone). The UE can transmit transmissions to the base station and the UE can also receive the transmission from the base station. Optionally, not shown in FIG. 4, the moving base station can also serve as a relay which relays the received transmission from the UE to a ground base station or vice versa.

Spaceborne platform includes satellite, and the satellite includes LEO satellite, MEO satellite and GEO satellite. While the satellite is moving, the LEO and MEO satellite is moving with regards to a given location on earth. However, for GEO satellite, the GEO satellite is relatively static with regards to a given location on earth. A moving base station or satellite, e.g., in particular for LEO satellite or drone, communicates with a user equipment (UE) on the ground. Due to long distance between the UE and the base station on satellite, the beamformed transmission is needed to extend the coverage.

Figure 5:
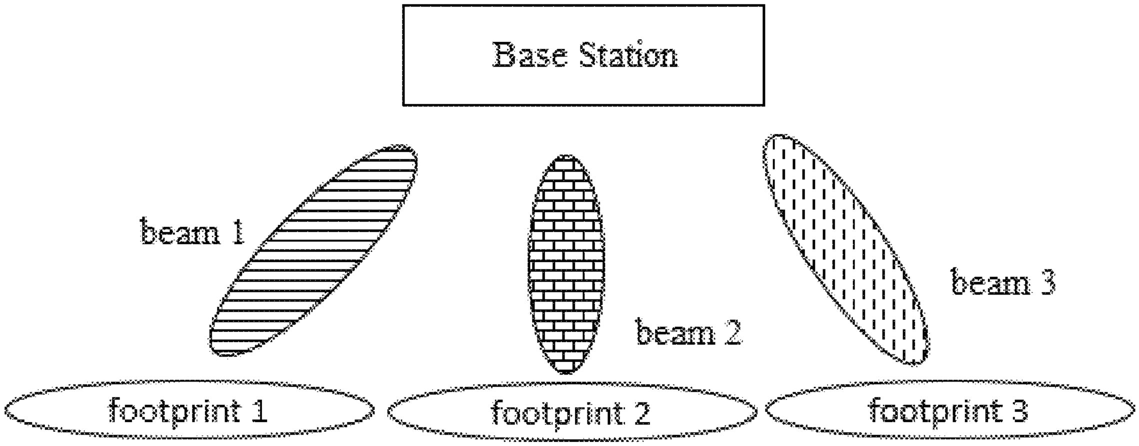
FIG. 5 is a schematic diagram illustrating that a BS transmits 3 beams to the ground forming 3 footprints according to an embodiment of the present disclosure.

Optionally, as illustrated in FIG. 5, where a base station is integrated in a satellite or a drone, and the base station transmits one or more beams to the ground forming one or more coverage areas called footprint. In FIG. 5, an example illustrates that the BS transmits three beams (beam 1, beam 2 and beam 3) to form three footprints (footprint 1, 2 and 3), respectively. Optionally, 3 beams are transmitted at 3 different frequencies. In this example, the bit position is associated with a beam. FIG. 5 illustrates that, in some embodiments, a moving base station, e.g., in particular for LEO satellite or drone, communicates with a user equipment (UE) on the ground. Due to long distance between the UE and the base station on satellite, the beamformed transmission is needed to extend the coverage. As illustrated in FIG. 5, where a base station is transmitting three beams to the earth forming three coverage areas called footpoints. Moreover, each beam may be transmitted at dedicated frequencies so that the beams for footprint 1, 2 and 3 are non-overlapped in a frequency domain. The advantage of having different frequencies corresponding to different beams is that the inter-beam interference can be minimized.

In some embodiments, a moving base station (BS), e.g., in particular for LEO satellite or drone, communicates with a user equipment (UE) on the ground. A round trip time (RTT) between the BS and the UE is time varying. The RTT variation is related to a distance variation between the BS and the UE. The RTT variation rate is proportional to a BS motion velocity. To ensure a good uplink synchronization, the BS will adjust an uplink transmission timing and/or frequency for the UE. In some embodiments of this disclosure, a method for uplink synchronization adjustment is provided, and the uplink synchronization adjustment comprises at least one of the followings: a transmission timing adjustment or a transmission frequency adjustment. Optionally, the transmission timing adjustment further comprises a timing advance (TA) adjustment.

Figure 6:
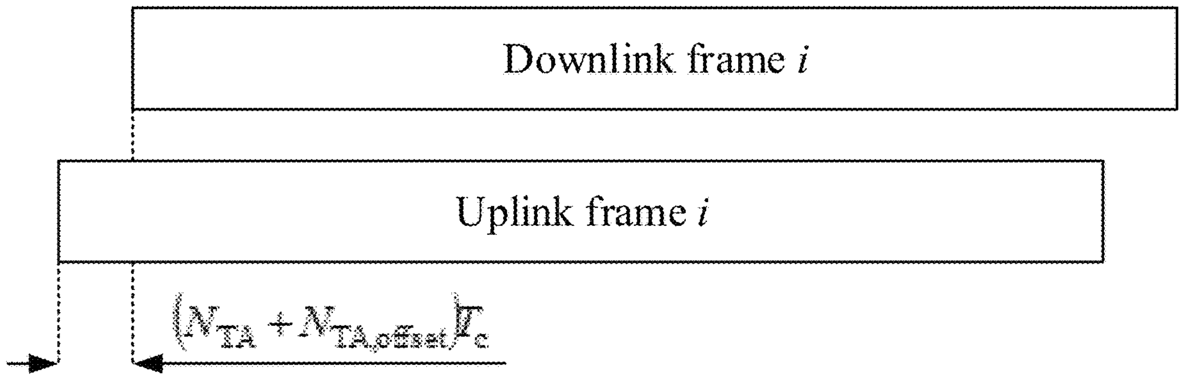
FIG. 6 is a schematic diagram illustrating an uplink-downlink timing relation according to an embodiment of the present disclosure.

FIG. 6 illustrates an uplink-downlink timing relation according to an embodiment of the present disclosure. FIG. 6 illustrates that, in some embodiments, downlink, uplink, and sidelink transmissions are organized into frames with $T_f=(\Delta f_{max}N_f/100)\cdot T_c10$=ms duration, each consisting of ten subframes of $T_f=(\Delta f_{max}N_f/100)\cdot T_c=1$ ms duration. $T_f$ refers to a radio frame duration. $\Delta_f$ refers to subcarrier spacing. $n_f$ refers to a system frame number (SFN). $T_c$ refers to a basic time unit for NR. $T_{sf}$ refers to a subframe duration. The number of consecutive orthogonal frequency division multiplexed (OFDM) symbols per subframe is $$N_{symb}^{subframe,\mu}=N_{symb}^{slot}N_{slot}^{subframe,\mu}\cdot N_{symb}^{subframe,\mu}$$

refers to number of OFDM symbols per subframe for subcarrier spacing configuration μ.

$$N_{symb}^{slot}$$

refers to number of symbols per slot.

$$N_{slot}^{subframe,\mu}$$

refers to number of slots per subframe for subcarrier spacing configuration μ. Each frame is divided into two equally-sized half-frames of five subframes each with half-frame 0 consisting of subframes 0 to 4 and half-frame 1 consisting of subframes 5 to 9. There is one set of frames in the uplink and one set of frames in the downlink on a carrier. Uplink frame number i for transmission from the UE starts $T_{TA}=(N_{TA}+N_{TA,offset})T_c$ before the start of the corresponding downlink frame at the UE where $N_{TA,offset}$ is given by TS 38.213, except for a message A (msgA) transmission on physical uplink shared channel (PUSCH) where $T_{TA}=0$ is used. $T_{TA}$ refers to timing advance between downlink and uplink. $N_{TA}$ refers to timing advance between downlink and uplink. $N_{TA,offset}$ refers to a fixed offset used to calculate the timing advance. $T_c$ refers to a basic time unit for NR.

Figure 7:
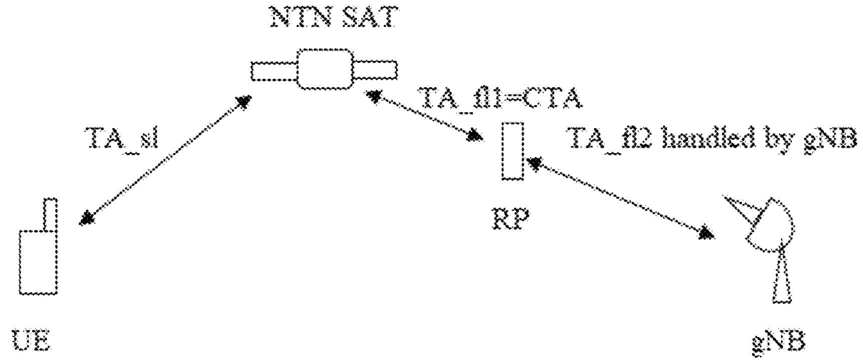
FIG. 7 is a schematic diagram illustrating an example of a communication over an NTN system including a UE, a NTN satellite, and a gNB/gateway according to an embodiment of the present disclosure.

FIG. 7 illustrates an example of a communication over an NTN system including a UE, a NTN satellite, and a gNB/gateway according to an embodiment of the present disclosure. FIG. 7 illustrates that, in some embodiments, a system includes a base station, a satellite, and one or more UEs. Optionally, the system may include more than one satellites, and each of the satellites may connect to one or more UEs. For downlink transmission between a gNB and a UE, the gNB transmits a signal/channel to a satellite via a feeder link (FL). Then, the satellite forwards the signal/channel to the UE via a serving link (SL) as illustrated in FIG. 7. For uplink transmission from the UE to the gNB, the UE transmits a signal/channel to the satellite via the SL and then the satellite forwards the signal/channel to the gNB via the FL. For the communication in an NTN system, the UE needs to maintain a reliable uplink synchronization which includes that the UE needs to pre-compensate the propagation delay over the SL and/or the FL and/or a part of the FL.

In this disclosure, some embodiments present a method for a UE to maintain an accurate UL synchronization on FL. As illustrated in FIG. 7, a FL is a link between an NTN satellite and a gNB or gateway on earth. The FL is used to serve a backhaul link. A UE needs to maintain an accurate UL synchronization, which includes pre-compensating a propagation delay for the FL or a part of the FL, so that the gNB may ensure a slot boundary alignment between a downlink slot and an uplink slot, leading to a feasible implementation. For a full FL propagation delay compensation, the UE can obtain a propagation delay between the satellite and the gNB/gateway on earth, then pre-compensates this delay for the uplink transmission. For partial FL propagation delay compensation, the UE can obtain a propagation delay between the satellite and a reference point (RP) as illustrated in FIG. 7, then the UE pre-compensates this delay and the rest of the delay will be handled by the network itself.

In some embodiments, some exemplary methods are illustrated as follows. For an uplink transmission performed by a UE, the UE can apply a timing advance for the uplink transmission, wherein the timing advance comprises at least a first timing advance and a second timing advance, a first timing advance is relevant to a SL propagation delay, and the second timing advance is relevant to a FL propagation delay. In some examples, the second timing advance is equal to twice of the FL propagation delay. In some examples, the FL propagation delay comprises a delay between an NTN satellite and a reference point (RP). In some examples, the RP may be on a gNB or gateway. In some examples, the FL propagation delay is obtained from at least one of the followings: a first position, a second position, a third position, a parameter, or an offset.

In some examples, the FL propagation delay (FL delay in short) is obtained from a first position and a second position, and the first position is a position of the NTN satellite, and the second position is a position of the RP. The FL propagation delay is calculated from a distance and a velocity, and the distance is between the NTN satellite and the RP. The velocity is the speed over the link between the NTN satellite and the RP. In some examples, to calculate a FL delay at time T0, it is calculated by Distance(T0)/Velocity(T0), where Distance (T0) is the distance between the NTN satellite at T0 and the RP at T0. In some examples, the RP position may be static over time. It is to note that the first position may also be a position for other Space-borne vehicles or Airborne vehicles.

In some examples, the first position and/or the second position and/or the third position comprises values at two dimensions (positions in axis X and axis Y) or three dimensions (positions in axis X, axis Y and axis Z). In some examples, the first position and/or the second position and/or the third position further comprises velocity in two dimensions (velocity in axis X and axis Y) or three dimensions (velocity in axis X, axis Y and axis Z). In some examples, the first position and/or the second position and/or the third position further comprises one or more reference time corresponding to the position and/or velocity. In some examples, the first position and/or the second position are provided by the network to the UE. In some examples, the first position and/or the second position are provided in the system information and/or UE-specific RRC configuration. In some examples, the one or more reference time is corresponding to one or more slot boundaries or frame boundaries.

In some examples, the FL delay is obtained from the first position, the third position and the offset. The FL delay is obtained from a second delay and shifted by the offset in time. For example, for obtaining a FL delay at time T0, it may be obtained from the second delay at time T0+D, i.e., FL delay (T0)=second delay (T0+D), where D is the offset. In some examples, the value of D may be positive or negative or zero. In some examples, the second delay is obtained from the first position and the third position. The second delay is calculated from a second distance and a second velocity, and the second distance is between the NTN satellite and the third position. The second velocity is the speed over the link between the NTN satellite and the third position. In some examples, to calculate a second delay at time T0, it is calculated by Distance2 (T0)/Velocity2(T0), where Distance2 (T0) is the second distance between the NTN satellite at T0 and the third position at T0. In some examples, the third position may be static over time. In some examples, the first position and/or the third position and/or the offset are provided by the network to the UE. In some examples, they are provided in the system information and/or UE-specific RRC configuration. In some examples, the third position is different from the second position.

In some examples, the FL delay is obtained from the first position, the third position and the parameter. The FL delay is obtained from the second delay and shifted by a second offset in time. For example, for obtaining a FL delay at time T0, it may be obtained from the second delay at time T0+D2, i.e., FL delay (T0)=second delay (T0+D), where D2 is the second offset. The second delay is calculated in a way presented in the previous example, i.e., the second delay is calculated from a second distance and a second velocity, wherein the second distance is between the NTN satellite and the third position. The second velocity is the speed over the link between the NTN satellite and the third position. In some examples, to calculate a second delay at time T0, it is calculated by Distance2 (T0)/Velocity2(T0), where Distance2 (T0) is the second distance between the NTN satellite at T0 and the third position at T0. In some examples, the second offset is obtained from the second delay at one or more reference time (T_ref) and the parameter, where the parameter comprises one or more FL delay values corresponding to the one or more reference time T_ref. For example, the UE may find a value of D2, such that an absolute value of the difference between the FL propagation delay at the one or more reference time T_ref and the second delay at the one or more reference time T_ref shifted by the second offset is less than a first value, where D2 may be positive or negative or zero. In some examples, the first value is a maximum tolerance error of the difference between the FL propagation delay and the second delay shifted by D2. In some examples, the first value may be zero. In some examples, the first value is pre-defined or pre-configured. In some examples, a unit of the first value comprises millisecond, microsecond, or nanosecond. In some examples, the first value is equal to or less than 1 millisecond, 1 microsecond, or 1 nanosecond.

In some examples, the parameter may be provided by the network to the UE. In some examples, the parameter is provided in the system information and/or UE-specific RRC configuration. In some examples, the reference time comprises at least one of the followings: one or more slot boundary, one or more frame boundary. In some examples, the parameter comprises a first FL delay corresponding to a first reference time. The parameter is received by the UE in a first slot, the first reference time comprises the first slot boundary. In some examples, the parameter comprises a second FL delay corresponding to a second reference time. The parameter is received by the UE in the first slot, the second reference time comprises a second slot boundary, wherein the second slot is a number of slots after the first slot. In some examples, the number of slots may be pre-defined or configured by the network. In some examples, the number of slots is configured in the system information and/or UE-specific RRC configuration. In some examples, the parameter is received by the UE within a first frame, and the first reference time comprises the first frame boundary. In some examples, the parameter comprises a second FL propagation delay corresponding to a second reference time. The parameter is received by the UE within the first frame, the second reference time comprises a second frame boundary, and the second frame is a number of frames after the first frame. In some examples, the number of frames may be pre-defined or configured by the network. In some examples, the number of frame is configured in the system information and/or UE-specific RRC configuration. In some examples, the FL propagation delay is common to one or more UEs within a serving cell.

In some examples, the parameter is transmitted in a PDSCH transmission. The parameter being received by the UE in a slot means that the PDSCH carrying the parameter is received in the slot. Similarly, the parameter being received within a frame means that the PDSCH carrying the parameter is received in the slot within the frame. It is to note that the reference time determination for the first position and/or the second position and/or the third position as in the previous examples can use a similar approach and therefore it is not repeated here.

Commercial interests for some embodiments are as follows. 1. Solving issues in the prior art. 2. Providing a method for UE operation in non-terrestrial network (NTN) systems. 3. Reducing signaling overhead. 4. Providing a good communication performance. 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 8:
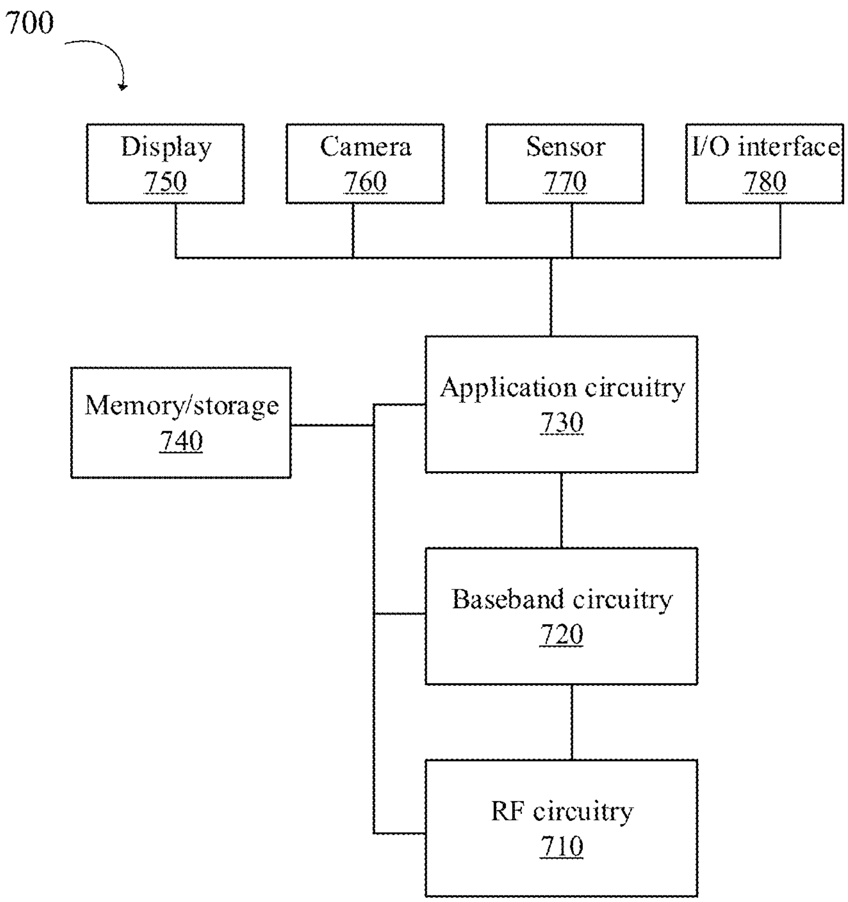
FIG. 8 is a block diagram of a system for wireless communication according to an embodiment of the present disclosure.

FIG. 8 is a block diagram of an example system 700 for wireless communication according to an embodiment of the present disclosure. Embodiments described herein may be implemented into the system using any suitably configured hardware and/or software. FIG. 8 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

determining, by the UE, a first information and/or a second information; and applying, by the UE, the first information and/or the second information for a downlink reception and/or an uplink transmission, wherein the second information comprises a second timing advance, and the second timing advance is relevant to a feeder link (FL) propagation delay;

the FL propagation delay is obtained from at least one of the followings: a first position, a second position, a third position, a parameter, or an offset, wherein the first position, the second position, the third position, the parameter, and/or the offset is provided by the base station to the UE;

the first position, the second position, the third position, the parameter, and/or the offset is provided in the system information and/or UE-specific radio resource control (RRC) configuration wherein the FL propagation delay is obtained from the first position and the third position, the FL propagation delay is obtained from a second delay, the second delay is calculated from a second distance and a second velocity;

the second distance is between the first position and the third position; and the second velocity is a speed over a link between the first position and the third position.

2. The method of claim 1, wherein the first information comprises a first timing advance;

the first timing advance is relevant to a service link (SL) propagation delay; the second timing advance is equal to twice of the FL propagation delay, and/or the second timing advance is a common TA to the UE;

the FL propagation delay comprises a delay between a non-terrestrial network (NTN) satellite, a space-borne vehicle, or an airborne vehicle and a reference point (RP), and/or the FL propagation delay is common to one or more UEs within a serving cell; and the RP is on a base station or a gateway.

3. The method of claim 1, wherein the first position is a position of a non-terrestrial network (NTN) satellite, a space-borne vehicle, or an airborne vehicle, and/or the second position is a position of a reference point (RP).

4. The method of claim 3, wherein the position of the RP or the third position is static over time.

5. The method of claim 1, wherein the first position, the second position, and/or the third position comprises values at two dimensions or three dimensions; and the two dimensions comprise positions in axis X and axis Y, and/or the three dimensions comprise positions in axis X, axis Y and axis Z.

6. The method of claim 1, wherein the first position, the second position, and/or the third position comprises velocity at two dimensions or three dimensions; and the two dimensions comprise positions in axis X and axis Y, and/or the three dimensions comprise positions in axis X, axis Y and axis Z.

7. The method of claim 1, wherein the first position, the second position, and/or the third position comprises one or more reference time corresponding to a position of the first position, the second position, and/or the third position and/or a velocity of the first position, the second position, and/or the third position; and the one or more reference time are corresponding to one or more slot boundaries or frame boundaries.

8. The method of claim 1, wherein the FL propagation delay is obtained from the first position, the third position and the offset; the FL propagation delay is obtained from the second delay and shifted by the offset in time; a value of the offset is positive, negative, or zero.

9. The method of claim 1, wherein the FL propagation delay is obtained from the first position, the third position and the parameter.

10. The method of claim 9, wherein the FL propagation delay is obtained from the second delay and shifted by a second offset in time, and/or the FL propagation delay at time TO is obtained from the second delay at time TO+offset;

the second offset is obtained from the second delay at one or more reference time (T_ref) and the parameter;

the parameter comprises one or more FL delay values corresponding to the one or more reference time T-ref;

a value of the second offset is positive, negative, or zero;

an absolute value of the difference between the FL propagation delay at the one or more reference time T_ref and the second delay at the one or more reference time T_ref shifted by the second offset is less than a first value, and/or the FL propagation delay at the one or more reference time T_ref is equal to the second delay at the one or more reference time Tref shifted by the second offset;

the first value is pre-defined or pre-configured, and/or the first value is a maximum tolerance error of a difference between the FL propagation delay and the second delay shifted by the second offset, and/or the first value is zero;

a unit of the first value comprises millisecond, microsecond, or nanosecond; and the first value is equal to or less than 1 millisecond, 1 microsecond, or 1 nanosecond.

11. The method of claim 10, wherein the parameter comprises a first FL delay corresponding to a first reference time; and the parameter is received by the UE in a first slot, the first reference time comprises a first slot boundary.

12. The method of claim 10, wherein the parameter comprises a second FL delay corresponding to a second reference time.

13. The method of claim 12, wherein the parameter is received by the UE in the first slot, and the second reference time comprises a second slot boundary;

the second slot is a number of slots after the first slot, the number of slots is pre-defined or configured by the base station; and the number of slots is configured in a system information and/or a UE-specific RRC configuration.

14. The method of claim 12, wherein the parameter is received by the UE within a first frame, and the first reference time comprises the first frame boundary;

the parameter comprises a second FL delay corresponding to a second reference time;

the parameter is received by the UE within a first frame, and the second reference time comprises a second frame boundary;

the second frame is a number of frames after the first frames;

the number of frames is pre-defined or configured by the base station; the number of frames is configured in a system information and/or a UE-specific RRC configuration; and the parameter is transmitted in a PDSCH transmission.

15. A wireless communication method by a base station comprising:

controlling a user equipment (UE) to determine a first information and/or a second information; and controlling the UE to apply the first information and/or the second information for a downlink reception and/or an uplink transmission, wherein the second information comprises a second timing advance, and the second timing advance is relevant to a feeder link (FL) propagation delay;

the FL propagation delay is obtained from at least one of the followings: a first position, a second position, a third position, a parameter, or an offset, wherein the first position, the second position, the third position, the parameter, and/or the offset is provided by the base station to the UE; the first position, the second position, the third position, the parameter, and/or the offset is provided in the system information and/or UE-specific radio resource control (RRC) configuration, wherein the FL propagation delay is obtained from the first position and the third position, the FL propagation delay is obtained from a second delay, the second delay is calculated from a second distance and a second velocity;

the second distance is between the first position and the third position; and the second velocity is a speed over a link between the first position and the third position.

16. A user equipment (UE), comprising:

a memory; a transceiver; and a processor coupled to the memory and the transceiver;

wherein the processor is configured to perform a wireless communication method, and the method comprises:

determining, by the UE, a first information and/or a second information; and applying, by the UE, the first information and/or the second information for a downlink reception and/or an uplink transmission, wherein the second information comprises a second timing advance, and the second timing advance is relevant to a feeder link (FL) propagation delay;

the FL propagation delay is obtained from at least one of the followings: a first position, a second position, a third position, a parameter, or an offset, wherein the first position, the second position, the third position, the parameter, and/or the offset is provided by the base station to the UE;

the first position, the second position, the third position, the parameter, and/or the offset is provided in the system information and/or UE-specific radio resource control (RRC) configuration, wherein the FL propagation delay is obtained from the first position and the third position, the FL propagation delay is obtained from a second delay, the second delay is calculated from a second distance and a second velocity;

the second distance is between the first position and the third position; and the second velocity is a speed over a link between the first position and the third position.

* * * * *